US009661643B2

(12) United States Patent
Kalyani et al.

(10) Patent No.: US 9,661,643 B2
(45) Date of Patent: May 23, 2017

(54) COGNITIVE INTERFERENCE MANAGEMENT IN WIRELESS NETWORKS WITH RELAYS, MACRO CELLS, MICRO CELLS, PICO CELLS AND FEMTO CELLS

(71) Applicants: Sheetal Kalyani, Chennai (IN); Sunil Kaimalettu, Chennai (IN); Rajet Krishnan, Chennai (IN); Nadeem Akhtar, Chennai (IN); Jeniston Deviraj Klutto Milleth, Chennai (IN); Kiran Kumar Kuchi, Chennai (IN); Bhaskar Ramamurthi, Chennai (IN)

(72) Inventors: Sheetal Kalyani, Chennai (IN); Sunil Kaimalettu, Chennai (IN); Rajet Krishnan, Chennai (IN); Nadeem Akhtar, Chennai (IN); Jeniston Deviraj Klutto Milleth, Chennai (IN); Kiran Kumar Kuchi, Chennai (IN); Bhaskar Ramamurthi, Chennai (IN)

(73) Assignee: CENTRE OF EXCELLENCE IN WIRELESS TECHNOLOGY, Chennai (IN)

( * ) Notice: Subject to any disclaimer, the term of this patent is extended or adjusted under 35 U.S.C. 154(b) by 128 days.

(21) Appl. No.: 14/661,746

(22) Filed: Mar. 18, 2015

(65) Prior Publication Data

US 2015/0195843 A1 Jul. 9, 2015

Related U.S. Application Data

(62) Division of application No. 13/257,667, filed as application No. PCT/IN2010/000162 on Mar. 19, 2010, now Pat. No. 9,014,636.

(30) Foreign Application Priority Data

Mar. 20, 2009 (IN) .............................. 635/CHE/2009
Sep. 18, 2009 (IN) ........................... 2280/CHE/2009
Nov. 2, 2009 (IN) ........................... 2649/CHE/2009

(51) Int. Cl.
H04W 72/08 (2009.01)
H04L 5/00 (2006.01)
(Continued)

(52) U.S. Cl.
CPC ......... *H04W 72/082* (2013.01); *H04L 5/0062* (2013.01); *H04L 5/0073* (2013.01);
(Continued)

(58) Field of Classification Search
CPC ............. H04W 72/085; H04W 72/082; H04W 52/244; H04W 24/08; H04W 72/08;
(Continued)

(56) References Cited

U.S. PATENT DOCUMENTS 5,793,757 A 8/1998 Uddenfeldt
5,815,801 A 9/1998 Hamalainen et al.
(Continued)

*Primary Examiner* — Meless Zewdu
(74) *Attorney, Agent, or Firm* — Rahman LLC

(57) ABSTRACT

Cognitive interference management in Cellular wireless network with relays and micro/pico/femto cells operated in distributed scheduling mode. A cellular system may use RS to improve capacity or for coverage extension. ARS relays the signals between BS 104 and MS by using wireless links between BS-RS and RS-MS during both downlink and uplink transmissions. Embodiments herein disclose a mechanism to explicitly indicate to the MS whether the MAC management messages sent by the BS to the MS are to inform it to perform scanning for interference measurement. Also, disclosed herein is a mechanism to explicitly indicate to the BS whether the message sent by the MS is related to interference measurement.

19 Claims, 7 Drawing Sheets

(51) Int. Cl.
*H04L 12/26* (2006.01)
*H04W 24/08* (2009.01)
*H04W 52/24* (2009.01)

(52) U.S. Cl.
CPC .............. *H04L 43/04* (2013.01); *H04L 43/08* (2013.01); *H04W 24/08* (2013.01); *H04W 52/244* (2013.01); *H04W 72/085* (2013.01)

(58) Field of Classification Search
CPC ..... H04W 52/24; H04W 52/04; H04W 52/16; H04W 52/221; H04W 52/228; H04L 5/0062; H04L 43/04; H04L 43/08; H04L 5/0073; H04L 5/00; H04L 12/26; H04L 27/00; H04J 11/0023; H04J 11/005; H04J 11/00; H04J 11/0009; H04J 11/0016
See application file for complete search history.

(56) References Cited

U.S. PATENT DOCUMENTS

| | | | |
|---|---|---|---|
| 6,570,857 B1 | 5/2003 | Haartsen et al. | |
| 7,573,960 B2 * | 8/2009 | Yamaguchi | H04B 1/0475 375/346 |
| 7,627,048 B2 | 12/2009 | Larsson | |
| 7,724,813 B2 | 5/2010 | Wang et al. | |
| 2002/0146044 A1 | 10/2002 | Esmailzadeh et al. | |
| 2003/0228871 A1 | 12/2003 | Bernhard et al. | |
| 2005/0053043 A1 | 3/2005 | Rudolf et al. | |
| 2006/0084444 A1 * | 4/2006 | Kossi | H04W 84/18 455/450 |
| 2006/0111111 A1 | 5/2006 | Ovadia | |
| 2006/0188003 A1 * | 8/2006 | Larsson | H04B 1/719 375/130 |
| 2007/0025460 A1 | 2/2007 | Budiano et al. | |
| 2007/0110132 A1 | 5/2007 | Guess et al. | |
| 2007/0211790 A1 | 9/2007 | Agrawal et al. | |
| 2008/0084892 A1 | 4/2008 | Sheen et al. | |
| 2008/0090575 A1 | 4/2008 | Barak et al. | |
| 2008/0144493 A1 | 6/2008 | Yeh | |
| 2008/0186938 A1 | 8/2008 | Okazaki | |
| 2008/0187027 A1 | 8/2008 | Malladi | |
| 2009/0019169 A1 | 1/2009 | Li et al. | |
| 2009/0036081 A1 | 2/2009 | Catreux et al. | |
| 2009/0092059 A1 | 4/2009 | Fu | |
| 2009/0215457 A1 * | 8/2009 | Wang | H04L 5/0058 455/435.1 |
| 2009/0247201 A1 * | 10/2009 | Ye | H04W 16/14 455/509 |
| 2010/0054352 A1 * | 3/2010 | Huttunen | H04L 27/0006 375/260 |
| 2011/0034192 A1 * | 2/2011 | Lim | H04B 7/0417 455/501 |
| 2012/0082038 A1 * | 4/2012 | Xu | H04J 11/0023 370/244 |
| 2012/0257519 A1 * | 10/2012 | Frank | H04L 5/0035 370/252 |
| 2014/0018120 A1 * | 1/2014 | Anbe | H04W 28/048 455/509 |

* cited by examiner

COGNITIVE INTERFERENCE MANAGEMENT IN WIRELESS NETWORKS WITH RELAYS, MACRO CELLS, MICRO CELLS, PICO CELLS AND FEMTO CELLS

CROSS REFERENCE TO RELATED APPLICATION

This application is a divisional of U.S. patent application Ser. No. 13/257,667, filed on Sep. 20, 2011, which claims priority to PCT Application No. PCT/IN2010/000162, filed on Mar. 19, 2010, which further claims priority to Indian Application No. 635/CHE/2009, filed on Mar. 20, 2009, Indian Application No. 2280/CHE/2009, filed on Sep. 18, 2009, and Indian Application No. 2649/CHE/2009, filed on Nov. 2, 2009, the contents of which in their entireties, are herein incorporated by reference.

TECHNICAL FIELD

The embodiments herein relate to communication networks and, more particularly, to interference management in communication networks.

BACKGROUND

A wireless communication network (e.g., employing frequency, time, space, and code division techniques) includes one or more base stations that provide services to a coverage area. A base station can simultaneously transmit multiple data streams for broadcast, multicast, and or unicast services. Communication between base station and mobile terminal can be degraded due to channel variations or interference caused by other base station/terminals, which are communicating within a same coverage area or from other nearby cell or sector. Variations of channel quality associated with changes in interference can be managed by a base station through power control, rate adaptation, or data-packet format reconfiguration, configuration for one or more access terminals. The adjustment relies upon receiving an interference indicator, which is conventionally received over the air interface.

Generally two main challenges of a wireless network operator are to improve network coverage and throughput of the cellular systems. In a cellular wireless system, relay stations (RS) and/or transparent relay stations (T-RS) and/or micro/femto/pico base stations (MBS/FBS/PBS) are often used by the operators to improve the capacity of the system and network coverage. A transparent relay is one that is transparent to the UEs in a broad sense that it cannot be a final destination for any of the information sent from the UE. Likewise, no information can originate from a transparent relay towards the UE. The introduction of RS and MBS/FBS/PBS systems into the network will add to the interference, affecting the user equipments (UE) not served by these components in the system. The quality of communication in a wireless system will depend on the ratio of the received signal to the interference. Interference is of two kind's co-channel interference and neighbor-channel interference. Co-channel interference is due to transmission from communication sources tuned to the same frequency as the operating channel. Neighbor-channel interference results from the communication sources using channels near the operating channel in the operating spectrum. All these effects lower the throughput of the system.

Further in a cellular wireless system, relay stations (RS) and micro/femto/pico base stations (MBS/FBS/PBS) are often used by operators/subscribers to improve capacity and/or coverage. Also in-band backhauling of BS-RS link often creates additional interference to the user equipment (UE) in the system thereby lowering the system throughput. Traditionally, interference management is done by static partitioning of resources between RS/MBS/FBS/PBS and BSs, which results in underutilization of resources as the reuse factor will be less than one.

Traditionally, static resource partitioning techniques have been adopted for interference management where the RSs, MBS/FBS/PBSs and the serving BS in a cell are pre-allocated orthogonal resources. Hereafter, serving BS shall refer to any entity located in the core network including, but not limited to BS, Femto Gateway or the core network itself. Such fixed or semi-static orthogonal resource allocation schemes are relatively easy to implement, but require fairly accurate prior estimates of the expected traffic load on RS s and MBS/FBS/PBSs. In the absence of this information, under-utilization or congestion of resources is inevitable.

The other approach is to schedule all RS/MBS/FBS/PBSs in a centralized manner at the BS by dynamic allocation of resources to RS/MBS/FBS/PBSs. But the major drawbacks associated with this mode of operation are increased control overheads (both signaling and implementation) and the time delay associated with it. This is because, BS sends the resource allocation information called RS-MAP to each RS in every frame, and each RS based on the RS-MAP, RS will transmit data to its associated UEs. Each step in the process such as deciding resource allocation for RS at BS, transmission and reception of RS-MAP and resource allocation at RS based on RS-MAP adds complexity and time delay.

RS support in both IEEE 802.16m and LTE-A are expected to use a distributed scheduling mode in addition to centralized scheduling. However, in the current form of distributed approach, the schedulers at each RS, MBS/FBS/PBS schedule their associated UEs independently with transmit power level information, MIMO schemes, modulation, frequency/resource allocation and code rates decided by RS without accounting for the interference experienced by the UEs in the system. This distributed scheduling scheme, though simple to implement, will result in increased interference thereby significantly reducing system throughput.

SUMMARY

In view of the foregoing, an embodiment herein provides a method for interference management in heterogeneous/homogeneous communication networks, wherein the communication networks have one or more Base Stations (BS), Relay Stations(RS),Femto Base Stations (FBS), Pico Base Stations (PBS), and Micro Base Stations (MBS). A User Equipment (UE) performs interference measurement for a specific group of the BS, RS, MBS, FBS, PBS and the UE sends the interference measurement to a serving the BS. A serving BS classifies each the UE as either a victim UE of the RS, BS, FBS, PBS and MBS or as a safe UE based on the measurement received from the UE and a scheduler assigns a set of resources to each of the RS, BS, FBS, PBS and MBS to be used in an access link based on the classification of the UE, wherein the set of resources are partially or completely orthogonal to the resources utilized by the victim UEs of the RS, BS, FBS, PBS and MBS. User data is repeated in original form or in modified form in a link between the BS, RS, MBS, FBS, PBS and particular the UEs, wherein the data repetition is to reduce any possible loss in performance in the access link due to unavailability of preferred band due to orthogonalization of resources, and/or power control in the access link to reduce the interference. The serving BS in the communication network can be any entity in the core network or the BS, RS, MBS, FBS, PBS. The access link is the link between the BS, RS, MBS, FBS, PBS and the UEs of the BS, RS, MBS, FBS, and PBS. The UE detects presence of the RS or the MBS, PBS and FBS in vicinity from the preamble and the UE reports the unique identifier, the RSSI and/or Carrier to Interference-plus-Noise Ratio (CINR) and/or a function of RSSI/CINR to the BS using a control message. The BS controls the transmit power of the RS, MBS, FBS, PBS using a control message. An UpLink (UL) power in the link between the UE and the BS, RS, MBS, FBS, PBS is controlled by the BS, RS, MBS, FBS, and PBS. The resources are reused by the BS. The control message informs the RS about the UE experiencing non negligible interference from the RS. The UE performs interference/signal measurement for a the group of BS, RS, MBS, FBS, PBS in the communication networks by measuring the Received Signal Strength Indication (RSSI) and/or the CINR and/or the function of the RSSI/CINR from the preamble for each the BS, RS, MBS, FBS, PBS in the group. The victim UE of a specific the BS, RS, MBS, FBS, PBS is any the UE that experiences significant interference from the BS, RS, MBS, FBS, PBS. The resources allocated by the scheduler for the access link of each the BS, RS, MBS, FBS, PBS can be partially or completely orthogonal in time and/or frequency and/or code and/or space. The user data is repeated in original form or in modified form in the access link of the specific group BS, RS, MBS, FBS, and PBS, wherein the data can be repeated in correlated and/or uncorrelated blocks of time and/or frequency and/or space and/or code.

Embodiments herein also provide a method for interference management in heterogeneous/homogeneous communication networks, wherein the communication networks have one or more Base Stations (BS), Relay Stations(RS), Transparent Relay Stations (T-RS), Femto Base Stations (FBS), Pico Base Stations (PBS) and Micro Base Stations (MBS). A serving BS assigns a pseudo preamble to the T-RS to enable a User Equipment (UE) to identify the T-RS. The UE performs interference measurement for a specific group of the BS, T-RS, RS, MBS, FBS and PBS and the UE sends the interference measurement to a serving the BS. A serving BS classifies each the UE as either a victim UE of the RS, BS, FBS, PBS and MBS or as a safe UE based on the measurement received from the UE and a scheduler assigns a set of resources to each of the BS, FBS, PBS and MBS to be used in an access link based on the classification of the UE, wherein the set of resources are partially or completely orthogonal to the resources utilized by the victim UEs of the RS, BS, FBS, PBS and MBS. Ranging codes are reserved for the T-RS for ranging of the UE in the access link. The BS communicates control signals directly to the UE or through the T-RS. The BS informs the UE about relevant timing advances/delays that may occur in the access link due to processing at the T-RS. The scheduler assigns specific resources for each UE of the T-RS. User data is repeated in original form or in modified form in a link between the BS, T-RS, RS, MBS, FBS, PBS and particular the UEs, wherein the data repetition is to reduce any possible loss in performance in the access link due to unavailability of preferred band due to orthogonalization of resources, and/or power control in the access link to reduce the interference and/or due to same MCS assignment for both access and backhaul link. The T-RS is assigned a unique identifier on being registered successfully. The T-RS derives the preamble from the unique identifier. The UE detects presence of the T-RS or the RS, MBS, PBS and FBS in vicinity from the preamble and the UE reports the unique identifier, the RSSI, and/or the Carrier to Interference-plus-Noise Ratio (CINR) and/or the function of CINR/RSSI to the BS using a control message. The control message indicates a resource on which the T-RS will forward the data. The RS forwards the data of the relay UE and the T-RS selectively forwards user data to UE as directed by the serving BS. The T-RS or the serving BS instructs the relay UE to advance transmission based on a timing offset measured from the ranging preamble/sounding channel. The BS controls the transmit power of the T-RS, RS, MBS, FBS, PBS using a control message. An UpLink (UL) power in the link between the UE and T-RS, RS, MBS, FBS, PBS, BS is controlled by the T-RS, RS, MBS, FBS, PBS, and BS. The resources are reused by the BS. The control message informs the T-RS about the UE experiencing non negligible interference from the RS. The resources are assigned for transmission of preamble by the BS, wherein any network controlling entity in the network can act as the BS. The control message informs the T-RS whether to relay the control messages to the UE. The UE performs interference/signal measurement for a the group of BS, RS, T-RS, MBS, FBS, PBS in the communication networks by measuring the Received Signal Strength Indication (RSSI), and/or the CINR and/or the function of CINR/RSSI from the preamble and/or midamble and/or pilots for each the T-RS, RS, MBS, FBS, PBS, BS in the group. The serving BS in the communication network can be any entity in the core network or the BS, RS, MBS, FBS, PBS. The access link is the link between the BS, T-RS, RS, MBS, FBS, PBS and the UEs of the BS, T-RS, RS, MBS, FBS, and PBS. The victim UE of a specific the BS, RS, T-RS, MBS, FBS, PBS is any the UE that experiences significant interference from the BS, RS, T-RS, MBS, FBS, PBS. The resources allocated by the scheduler for the access link of each the BS, RS, T-RS, MBS, FBS, PBS can be partially or completely orthogonal in time and/or frequency and/or code and/or space. User data is repeated in original form or in modified form in the access link of the specific group BS, RS, T-RS, MBS, FBS, and PBS, wherein the data can be repeated in correlated and/or uncorrelated blocks of time and/or frequency and/or space and/or code.

Also, disclosed herein is a method for interference management in heterogeneous/homogeneous communication networks, wherein the communication networks have one or more Base Stations (BS), Relay Stations(RS),Femto Base Stations (FBS), Pico Base Stations (PBS) and Micro Base Stations (MBS). A User Equipment (UE) performs interference measurement for a specific group of the BS, RS, MBS, FBS, PBS and the UE sends the interference measurement to a serving the BS. A serving the BS classifies each the UE as either a victim UE of the RS, BS, FBS, PBS and MBS or as a safe UE based on the measurement received from the UE. The serving the BS sends to each of the BS, RS, MBS, FBS, PBS a list of victim UEs or RS derives its list of its victim UEs, from UL signaling and each of the RS, BS, FBS, PBS and MBS performs resource allocation for the UEs of the RS, BS, FBS, PBS and MBS, wherein the set of resources are partially or completely orthogonal to the resources utilized by the victim UEs of the RS, BS, FBS, PBS and MBS. The BS, RS, MBS, FBS, PBS reads relevant resource allocation information messages of the victim UEs and uses the information to performing resource allocation for other associated the UEs of BS, RS, MBS, FBS, PBS. User data is repeated in original form or in modified form in a link between the BS, RS, MBS, FBS, PBS and particular the UEs, wherein the data repetition is to reduce any possible loss in performance in the access link due to unavailability of preferred band due to orthogonalization of resources, and/or power control in the access link to reduce the interference. The UE detects presence of the RS or the MBS, PBS and FBS in vicinity from the preamble and the UE reports the unique identifier, the RSSI and/or the Carrier to Interference-plus-Noise Ratio (CINR) and/or the function of RSSI/CINR to the BS using a control message. The BS controls the transmit power of the BS, RS, MBS, FBS, PBS using a control message. An UpLink (UL) power in the link between the UE and the BS, RS, MBS, FBS, PBS is controlled by the BS, RS, MBS, FBS, and PBS. The resources are reused by the BS. The control message informs the RS about the UE experiencing non negligible interference from the RS. The control message forwards ID of a victim UE to the RS, MBS, PBS and FBS. The control message forwards the resource allocation information of victim UEs to the MBS, PBS and FBS through a backhaul link or over the air interface. The UE performs interference/signal measurement for a the group of BS, RS, MBS, FBS, PBS in the communication networks by measuring the Received Signal Strength Indication (RSSI), the CINR from the preamble for each the BS/RS/MBS/FBS/PBS in the group. The serving BS in the communication network can be any entity in the core network or the BS, RS, MBS, FBS, PBS. The access link is the link between the BS, RS, MBS, FBS, PBS and the UEs of the BS, RS, MBS, FBS, and PBS. The victim UE of a specific the BS, RS, MBS, FBS, PBS is any the UE that experiences significant interference from the BS, RS, MBS, FBS, PBS. The resources allocated by the scheduler for the access link of each the BS, RS, MBS, FBS, PBS can be partially or completely orthogonal in time and/or frequency and/or code and/or space. User data is repeated in original form or in modified form in the access link of the specific group BS, RS, MBS, FBS, PBS, wherein the data can be repeated in correlated and/or uncorrelated blocks of time and/or frequency and/or space and/or code.

Embodiments herein provide a method to enable dynamic resource allocation for interference management in an access link of one or more Base Stations (BS), Relay Stations(RS),Transparent Relay Stations (T-RS), Femto Base Stations (FBS), Pico Base Stations (PBS), and Micro Base Stations (MBS) using multiple information elements in heterogeneous/homogeneous communication networks. At least one of multiple information elements are used wherein one of the multiple information elements are used to request any group of the BS, RS, T-RS, MBS, FBS, PBS to allocate, bar, add or subtract resources to be used in the access link. One of the multiple information elements is used to request for resource allocation information of any group of the BS, RS, T-RS, MBS, FBS, and PBS. One of the multiple information element is used to convey resource allocation information of the BS, RS, T-RS, MBS, FBS, PBS to requesting the BS, RS, T-RS, MBS, FBS, PBS and one of the multiple information element is used by the serving BS to allocate, bar, add or subtract resource to be used by the BS, RS, T-RS, MBS, FBS, PBS in the access link. The resource allocation information of a victim UE is shared between the BS, RS, T-RS, MBS, FBS, and PBS. The message containing the information element, forwards the DL-MAP and UpLink (UL)-MAP of the victim UEs to the BS, RS, T-RS, MBS, FBS, PBS through a backhaul link or over the air. The multiple information elements are defined in existing control messages or in a new message. The message containing the information elements is sent from the BS or an entity (resource controller) in the network indicating the set of resources the RS, T-RS, MBS, FBS, PBS can use in the access link. The set of resources is function of various metrics, wherein the metrics comprise at least one of system load, interference measurement, best band constraints, Quality of Service (QoS) requirements, persistent scheduling and traffic distribution for the RS and the BS. The message containing the information elements is Media Access Control (MAC) messages or core network messages, or part of the existing MAC/core network messages. One of the control messages is a RS-RA-MSG message. The RS-RA-MSG message contains multiple RS-RA-MSG-IE messages. The information elements have at least one of RS/T-RS/BS/PBS/FBS/MBS Unique Identifier, Number of non-contiguous allocations, Type of Allocation field, Offset in units of the minimum possible resource unit in frequency, Offset in units of the minimum possible resource unit in time, The amount by which the transmit power has to be increased or decreased. Duration for which the resource allocation is valid, Number of units of the minimum possible resource unit in time, Number of units of the minimum possible resource unit in frequency, Code sequence to be used and Antenna transmission mode. The message containing the information elements include multiple allocations for the RS, T-RS, MBS, FBS, and PBS. The message containing the information elements may contain multiple the information elements. The message containing the information elements are used to bar resources from being used by the RS, T-RS, MBS, FBS, and PBS. The message containing one of the information element is signaled by the RS, T-RS, MBS, FBS, PBS to a serving BS to request allocation and/or addition and/or subtraction and/or de-allocation of resources for its access link. The serving BS in the communication network can be any entity in the core network or the BS, RS, MBS, FBS, PBS. The message containing one of the information element is signaled by BS, RS, MBS, PBS, FBS to another BS, RS, T-RS, MBS, FBS, PBS or its serving BS to request barring or de-allocation of resources for their access link. The network has a centralized controller entity. The network has minimal centralized controller entity. The RS, T-RS, MBS, FBS, PBS requests for additional resources using control messages. The message containing one of the information elements is used to request for information about resources allocated to the RS, T-RS, MBS, FBS, and PBS. The information elements are piggybacked on to other messages. The message containing the information elements is transmitted at varying or fixed intervals. The message containing one of the information elements is used to perform contiguous/non-contiguous resource allocations and be able to add/subtract resources to/from the allocated resources. The message containing one of the information elements is used to bar resources. The message containing one of the information elements is used to indicate to the RS, T-RS, MBS, FBS, and PBS whether to perform power control in the allocated resources. The message containing one of the information elements is used to enable the BSs to share resource allocation information of RS and the MBS, PBS and FBS and victim UE with each other.

Embodiments herein disclose a method for interference management in heterogeneous/homogeneous communication networks, wherein the communication networks have one or more Base Stations (BS), Relay Stations(RS), Transparent Relay Station (T-RS), Femto Base Stations (FBS), Pico Base Stations (PBS) and Micro Base Stations (MBS). A User Equipment (UE) performs interference measurement for a specific group of the BS, T-RS, RS, MBS, FBS, PBS and the UE sends the interference measurement to a the serving BS and dynamic power control is applied over wide band pilots of BS, T-RS, RS, MBS, FBS, PBS based on the interference measurement from the UE, wherein the power control on wide band pilots is independent of the power control employed for the data blocks. The wide band pilots are common pilots. The BS, T-RS, RS, MBS, FBS, PBS uses at least one of dedicated pilots, a mix of wide band pilots with power control and the dedicated pilots and the wide band pilots with power control on the wide band pilots. The power control of the wide band pilots is a function of interference caused by the wide band pilots to the victim UE. The power control of the wide band pilots is a function of degradation in channel estimation for a UE. The power control is adaptive. The BS controls the transmit power of the RS, MBS, FBS, PBS, T-RS using a control message. An UpLink (UL) power in the link between the UE and the RS, MBS, FBS, PBS, T-RS is controlled by the RS, MBS, FBS, PBS or the serving BS. The serving BS in the communication network can be any entity in the core network or the BS, RS, MBS, FBS, PBS.

Disclosed herein is a method to enable dynamic distributed resource allocation for interference management for the access link of one or more Base Stations (BS), Relay Stations(RS),Femto Base Stations (FBS), Pico Base Stations (PBS), and Micro Base Stations (MBS) in a heterogeneous/homogeneous communication network. The RS, BS, FBS, PBS and MBS requests for resource allocation information from one or more the RS, BS, FBS, PBS and MBS. The RS, BS, FBS, PBS and MBS performs and/or changes own resource allocation for an access link using the resource allocation information about interfering the RS, BS, FBS, PBS and MBS. The RS, BS, FBS, PBS and MBS conveys the resource allocation information to other the RS, BS, FBS, PBS and MBS on request or in an unsolicited fashion and the RS, BS, FBS, PBS and MBS requests one or more of the RS, BS, FBS, PBS and MBS to allocate, bar, add or subtract resource to be used in the access link to mitigate interference caused by the resources to the access link. The serving BS can optionally indicate to each of the RS, BS, FBS, PBS and MBS the resources that can/cannot be used by the RS, BS, FBS, PBS and MBS. The RS, BS, FBS, PBS and MBS requests for the resource allocation information from one or more the RS, BS, FBS, PBS and MBS, at network entry. The RS, BS, FBS, PBS and MBS allocates the resources to the UEs using the resource allocation information received from other the RS, BS, MBS, FBS, PBS. The serving BS shares the resource allocation information of the RS, BS, MBS, FBS, PBS and victim the UEs with other the BS in the communication networks. The serving BS in the communication networks can be any entity in core of the network or the BS, RS, MBS, FBS, PBS. The network has a centralized controller entity. The network has minimal centralized controller entity. The RS and the MBS, PBS and FBS requests for additional resources using control messages.

Disclosed herein is a system for interference management in heterogeneous/homogeneous communication networks, wherein the communication networks have one or more Base Stations (BS), Relay Stations (RS), Femto Base Stations (FBS), Pico Base Stations (PBS), and Micro Base Stations (MBS). The system has a User Equipment (UE) perform interference measurement for a specific group of the BS, RS, MBS, FBS, PBS and the UE sending the interference measurement to a serving the BS. A serving BS classifies each UE as either a victim UE of the RS, BS, FBS, PBS and MBS or as a safe UE based on the measurement received from the UE and a scheduler assigns a set of resources to each of the RS, BS, FBS, PBS and MBS to be used in an access link based on the classification of the UE, wherein the set of resources are partially or completely orthogonal to the resources utilized by the victim UEs of the RS, BS, FBS, PBS and MBS. The system is adapted to repeat user data is in original form or in modified form in a link between the BS, RS, MBS, FBS, PBS and particular the UEs, wherein the data repetition is to reduce any possible loss in performance in the access link due to unavailability of preferred band due to orthogonalization of resources, and/or power control in the access link to reduce the interference. An UpLink (UL) power in the link between the UE and the BS, RS, MBS, FBS, PBS is controlled by the BS, RS, MBS, FBS, and PBS. A control message informs the RS about the UE experiencing non negligible interference from the RS. Resources are allocated by the scheduler for the access link of each the BS, RS, MBS, FBS, PBS can be partially or completely orthogonal in time and/or frequency and/or code and/or space. The system is adapted to repeat user data in original form or in modified form in the access link of the specific group BS, RS, MBS, FBS, PBS, wherein the data can be repeated in correlated and/or uncorrelated blocks of time and/or frequency and/or space and/or code.

Disclosed herein is a system for interference management in heterogeneous/homogeneous communication networks, wherein the communication networks have one or more Base Stations (BS), Relay Stations(RS), Transparent Relay Stations (T-RS), Femto Base Stations (FBS), Pico Base Stations (PBS), and Micro Base Stations (MBS). The system has a serving the BS assign a pseudo preamble to the T-RS to enable a User Equipment (UE) to identify the T-RS. A UE perform interference measurement for a specific group of the BS, T-RS, RS, MBS, FBS and PBS and the UE sends the interference measurement to a serving the BS. A serving BS classifies each the UE as either a victim UE of the RS, BS, FBS, PBS and MBS or as a safe UE based on the measurement received from the UE and a scheduler assigns a set of resources to each of the BS, FBS, PBS and MBS to be used in an access link based on the classification of the UE, wherein the set of resources are partially or completely orthogonal to the resources utilized by the victim UEs of the RS, BS, FBS, PBS and MBS. Ranging codes reserved for the T-RS for ranging of the UE in the access link. The scheduler assigns specific resources for each UE of the T-RS. The system is adapted to repeat user data in original form or in modified form in a link between the BS, T-RS, RS, MBS, FBS, PBS and particular the UEs, wherein the data repetition is to reduce any possible loss in performance in the access link due to unavailability of preferred band due to orthogonalization of resources, and/or power control in the access link to reduce the interference and/or due to same MCS assignment for both access and backhaul link. A control message to indicate a resource on which the T-RS will forward the data. An UpLink (UL) power in the link between the UE and T-RS, RS, MBS, FBS, PBS, BS is controlled by the T-RS, RS, MBS, FBS, PBS, and BS. The system is adapted to reuse resources by the BS. The control message informs the T-RS about the UE experiencing non negligible interference from the RS. The resources are assigned for transmission of preamble by the BS, wherein any network controlling entity in the network can act as the BS. The control message informs the T-RS whether to relay the control messages to the UE. The access link is the link between the BS, T-RS, RS, MBS, FBS, PBS and the UEs of the BS, T-RS, RS, MBS, FBS, and PBS. The victim UE of a specific BS, RS, T-RS, MBS, FBS, PBS is any the UE that experiences significant interference from the BS, RS, T-RS, MBS, FBS, PBS. The system is adapted to allocate resources by the scheduler for the access link of each the BS, RS, T-RS, MBS, FBS, PBS can be partially or completely orthogonal in time and/or frequency and/or code and/or space. The system is adapted to repeat user data in original form or in modified form in the access link of the specific group BS, RS, T-RS, MBS, FBS, PBS, wherein the data can be repeated in correlated and/or uncorrelated blocks of time and/or frequency and/or space and/or code.

Disclosed herein is a system for interference management in heterogeneous/homogeneous communication networks, wherein the communication networks have one or more Base Stations (BS), Relay Stations(RS),Femto Base Stations (FBS), Pico Base Stations (PBS), and Micro Base Stations (MBS). The system has a User Equipment (UE) perform interference measurement for a specific group of the BS, RS, MBS, FBS, PBS and the UE sends the interference measurement to a serving the BS. A serving the BS classify each the UE as either a victim UE of the RS, BS, FBS, PBS and MBS or as a safe UE based on the measurement received from the UE. The serving BS sends to each of the BS, RS, MBS, FBS, PBS a list of victim UEs or RS derives its list of its victim UEs, from UL signaling and each of the RS, BS, FBS, PBS and MBS performs resource allocation for the UEs of the RS, BS, FBS, PBS and MBS, wherein the set of resources are partially or completely orthogonal to the resources utilized by the victim UEs of the RS, BS, FBS, PBS and MBS. The adapted to repeat user data in original form or in modified form in a link between the BS, RS, MBS, FBS, PBS and particular the UEs, wherein the data repetition is to reduce any possible loss in performance in the access link due to unavailability of preferred band due to orthogonalization of resources, and/or power control in the access link to reduce the interference. An UpLink (UL) power in the link between the UE and the BS, RS, MBS, FBS, PBS is controlled by the BS, RS, MBS, FBS, and PBS. The system is adapted to reuse resources by the BS. The control message informs the RS about the UE experiencing non negligible interference from the RS. The system is adapted to wherein the access link is the link between the BS, RS, MBS, FBS, PBS and the UEs of the BS, RS, MBS, FBS, PBS. The system is adapted to have resources allocated by the scheduler for the access link of each the BS, RS, MBS, FBS, PBS can be partially or completely orthogonal in time and/or frequency and/or code and/or space. The system is adapted to repeat user data in original form or in modified form in the access link of the specific group BS, RS, MBS, FBS, PBS, wherein the data can be repeated in correlated and/or uncorrelated blocks of time and/or frequency and/or space and/or code.

Disclosed herein is a system to enable dynamic resource allocation for interference management in an access link of one or more Base Stations (BS), Relay Stations(RS),Transparent Relay Stations (T-RS), Femto Base Stations (FBS), Pico Base Stations (PBS), and Micro Base Stations (MBS) using multiple information elements in heterogeneous/homogeneous communication networks. The system uses one of the multiple information elements for requesting any group of the BS, RS, T-RS, MBS, FBS, and PBS to allocate, bar, add or subtract resources to be used in the access link. One of the multiple information elements is used for requesting for resource allocation information of any group of the BS, RS, T-RS, MBS, FBS, and PBS. One of the multiple information element convey resource allocation information of the BS, RS, T-RS, MBS, FBS, PBS to requesting the BS, RS, T-RS, MBS, FBS, PBS and one of the multiple information element is to allocate, bar, add or subtract resource to be used by the BS, RS, T-RS, MBS, FBS, PBS in the access link, by the serving BS. The system is adapted to share resource allocation information of a victim UE is shared between the BS, RS, T-RS, MBS, FBS, and PBS. The system is adapted to define the multiple information elements in existing control messages or in a new message. The network has a centralized controller entity or the network has minimal centralized controller entity. The system is adapted to piggyback the information elements on to other messages. The system is adapted to transmit the message containing the information elements at varying or fixed intervals.

Disclosed herein is a system for interference management in heterogeneous/homogeneous communication networks, wherein the communication networks have one or more Base Stations (BS), Relay Stations(RS), Transparent Relay Station (T-RS), Femto Base Stations (FBS), Pico Base Stations (PBS) and Micro Base Stations (MBS). A User Equipment (UE) performs interference measurement for a specific group of the BS, T-RS, RS, MBS, FBS, PBS and the UE sends the interference measurement to a the serving BS and dynamic power control is applied over wide band pilots of BS, T-RS, RS, MBS, FBS, PBS based on the interference measurement from the UE, wherein the power control on wide band pilots is independent of the power control employed for the data blocks. The wide band pilots are common pilots. The power control is adaptive. An UpLink (UL) power in the link between the UE and the RS, MBS, FBS, PBS, T-RS is controlled by the RS, MBS, FBS, PBS or the serving BS. The serving BS in the communication network can be any entity in the core network or the BS, RS, MBS, FBS, PBS.

Disclosed herein is a system to enable dynamic distributed resource allocation for interference management for the access link of one or more Base Stations (BS), Relay Stations(RS),Femto Base Stations (FBS), Pico Base Stations (PBS), and Micro Base Stations (MBS) in a heterogeneous/homogeneous communication network. The RS, BS, FBS, PBS and MBS requesting for resource allocation information from one or more the RS, BS, FBS, PBS and MBS. The RS, BS, FBS, PBS and MBS performing and/or changing own resource allocation for an access link using the resource allocation information about interfering the RS, BS, FBS, PBS and MBS. The RS, BS, FBS, PBS and MBS conveying the resource allocation information to other the RS, BS, FBS, PBS and MBS on request or in an unsolicited fashion and the RS, BS, FBS, PBS and MBS requesting one or more the RS, BS, FBS, PBS and MBS to allocate, bar, add or subtract resource to be used in the access link to mitigate interference caused by the resources to the access link. The serving BS can optionally indicate to each of the RS, BS, FBS, PBS and MBS the resources that can/cannot be used by the RS, BS, FBS, PBS and MBS. The RS, BS, FBS, PBS and MBS requests for the resource allocation information from one or more the RS, BS, FBS, PBS and MBS, at network entry. The RS, BS, FBS, PBS and MBS allocates the resources to the UEs using the resource allocation information received from other the RS, BS, MBS, FBS, PBS. The serving BS in the communication networks can be any entity in core of the network or the BS, RS, MBS, FBS, PBS. The network has a centralized controller entity or has minimal centralized controller entity. The RS and the MBS, PBS and FBS requests for additional resources using control messages.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
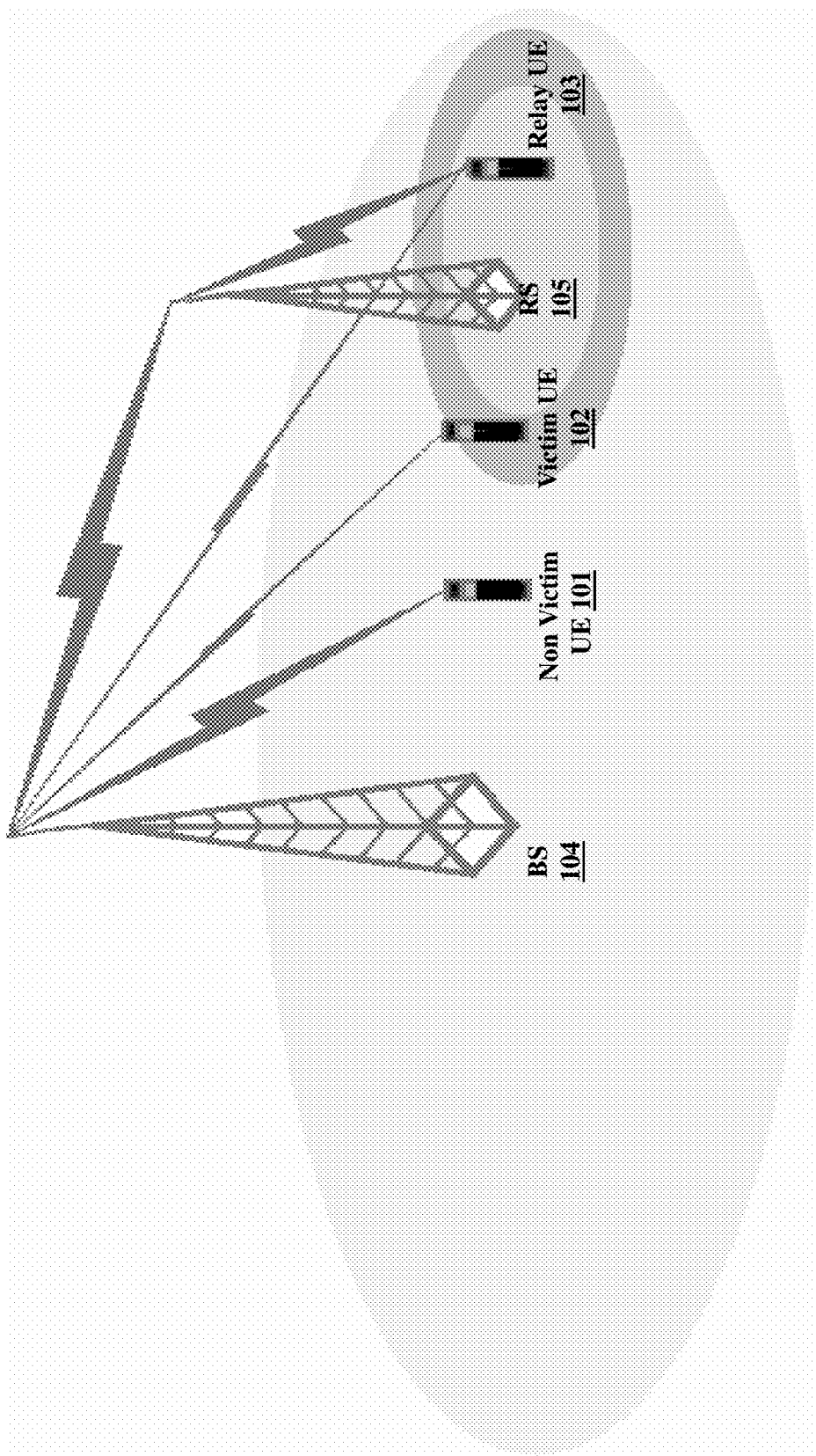
FIG. 1 illustrates capacity expansion relays, in accordance with the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and method Cognitive interference management in Cellular wireless network with relays Micro Base Station (MBS)/Pico Base Station (PBS)/Femto Base Station (FBS). Referring now to the drawings, and more particularly to FIGS. 1 through 5, where similar reference characters denote corresponding features consistently throughout the figures, there are shown embodiments.

FIG. 1 illustrates capacity expansion relays. A cellular system can use a Relay Station (RS) 105 to improve capacity. The RS 105 carries the signals from the Base Station (BS) 104 to User Equipment (UE) and vice-versa by using wireless links between BS 104 to RS 105 and RS 105 to UE. In networks where forms of broadband connectivity such as Digital Subscriber Line (DSL) or other alternatives are available, Micro Base Station (MBS)/Pico Base Station (PBS)/Femto Base Station (FBS) may be used instead of RS 105, with the BS 104 to RS 105 link substituted by a backhaul link. In the capacity improvement application, the RS 105 is used to improve the performance of UEs that experience low signal strength from the BS 104. RS 105 can also be used for coverage extensions to serve the UE that is not able to communicate directly with the BS 104.

The presence of RS 105 or MBS/PBS/FBS in a cellular system can sometimes lead to lower system performance due to the interference caused by the RS 105 or MBS/PBS/FBS to UE communicating directly with the BS 104 or any other RS/MBS/PBS/FBS. Interference caused to the UE may also be due to other neighboring BSs in the system. Additionally, interference maybe caused to any other RS communicating with the BS 104 or other UE in the network. The UE that experiences interference due to the RS 105 or MBS/PBS/FBS called victim UE 102 of the particular RS 105 or MBS/PBS/FBS. The victim UE 102 may experience a lower Signal-to-Noise-Plus-Interference Ratio (SINR) due to the presence of the RS 105 or the MBS/PBS/FBS resulting in a lower system throughput. The level of interference experienced by the victim UE 102 depends on the transmit power level of the RS 105 or the MBS/PBS/FBS.Furthermore, systems employing wide band cell specific reference signals for channel estimation, such as Long Term Evolution (LTE) systems, may be affected by interference from RS 105, resulting in poor channel estimation. Conversely, wide band cell specific reference signals transmitted by RS 105 may cause interference to data transmitted by BS 104 to its UEs. UEs can identify and report interference/signal measurements of RS 105 or MBS/PBS/FBS. The measurements reported by the UEs in the network about RS 105 and/or the MBS/PBS/FBS will be utilized by the network to perform appropriate scheduling and power control at the RS 105 and/or the MBS/PBS/FBS .A set of control messages are used to enable interference management in a wireless cellular system involving one or more RS 105 and/or MBS/PBS/FBS.

Figure 2:
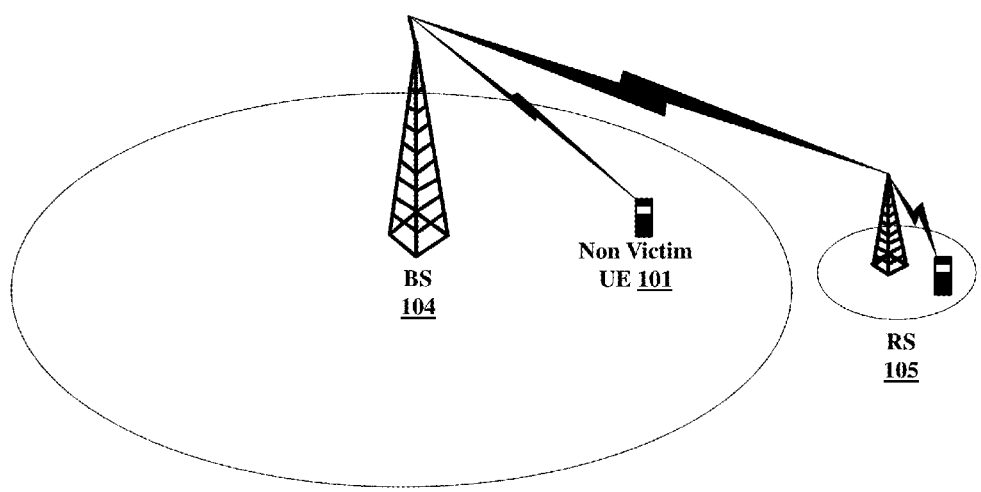
FIG. 2 illustrates coverage expansion relays, in accordance with the embodiments herein.

FIG. 2 illustrates coverage expansion relays. A cellular system can use the RS 105 for coverage expansion. The RS 105 carries the signals from the Base Station (BS) 104 to User Equipment (UE) and vice-versa by using wireless links between BS 104 to RS 105 and RS 105 to UE. In networks where forms of broadband connectivity such as Digital Subscriber Line (DSL) or other alternatives are available, Micro Base Station (MBS)/Pico Base Station (PBS)/Femto Base Station (FBS) may be used instead of RS 105, with the BS 104 to RS 105 link substituted by a backhaul link. RS 105 is used for coverage extensions to serve the UE that is not able to communicate directly with the BS 104.

Figure 3:
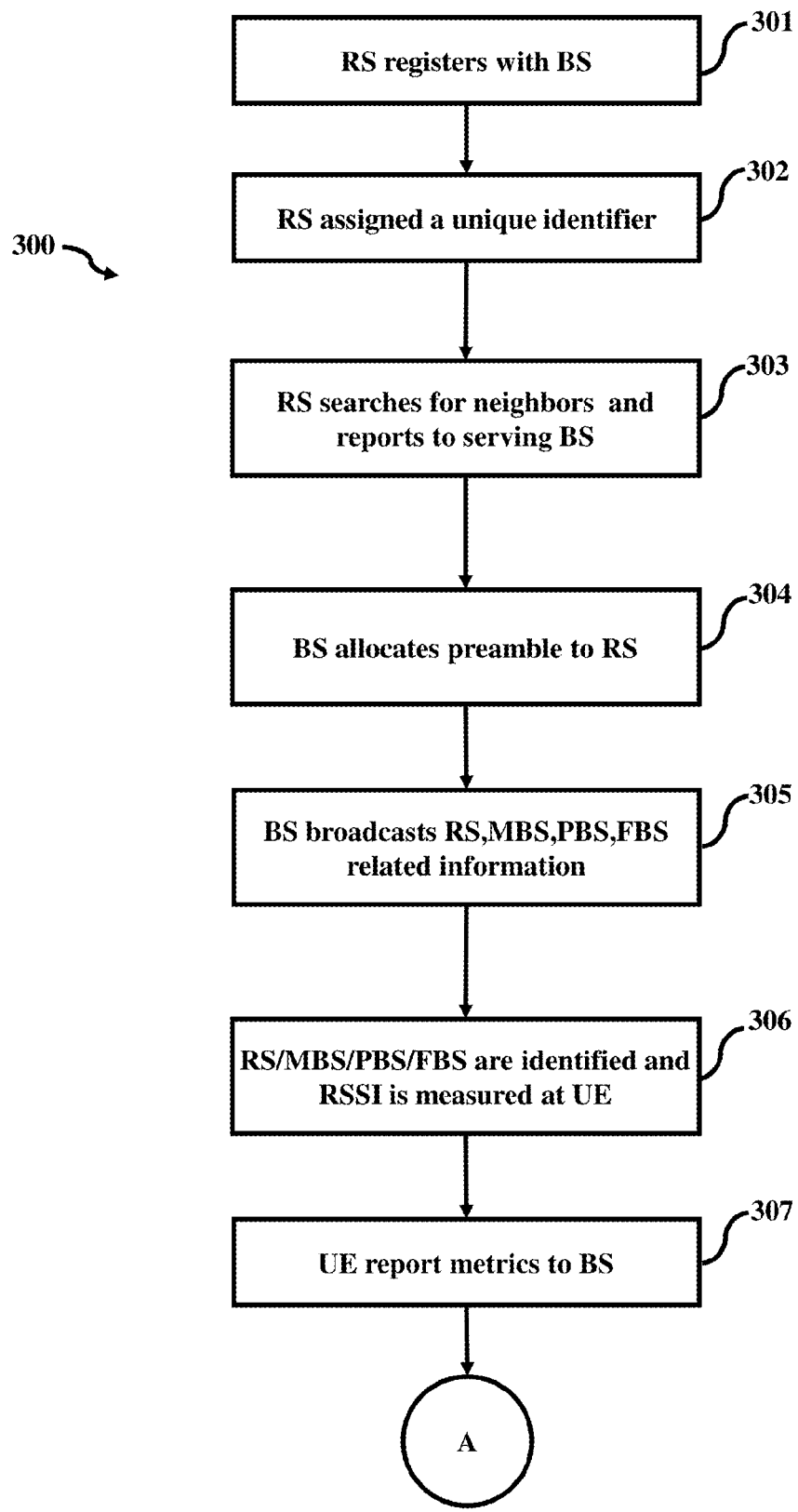
FIG. 3 is a flow chart depicting method for relay initialization and interference mitigation, in accordance with the embodiments herein.
Figure 3:
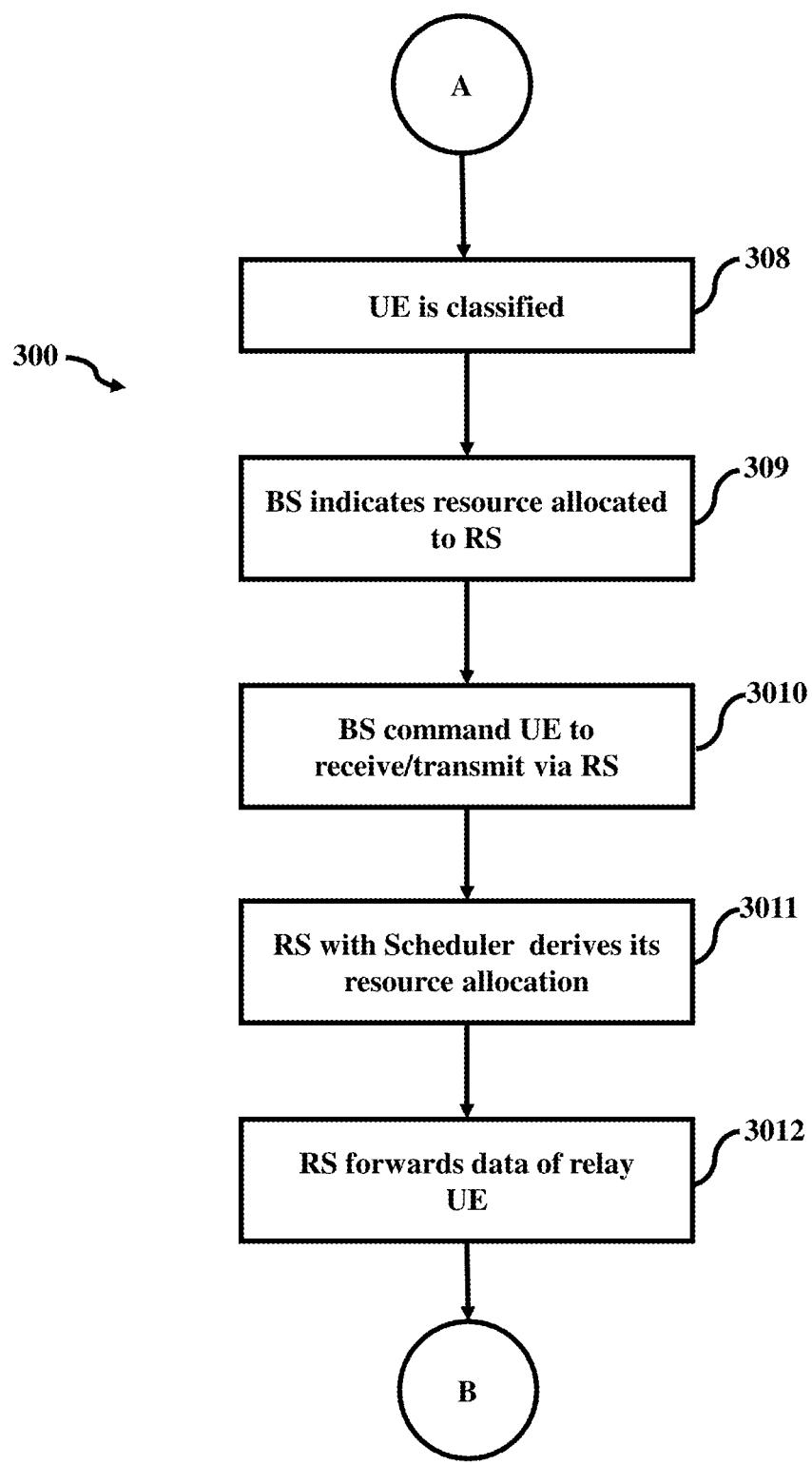
Figure 3:
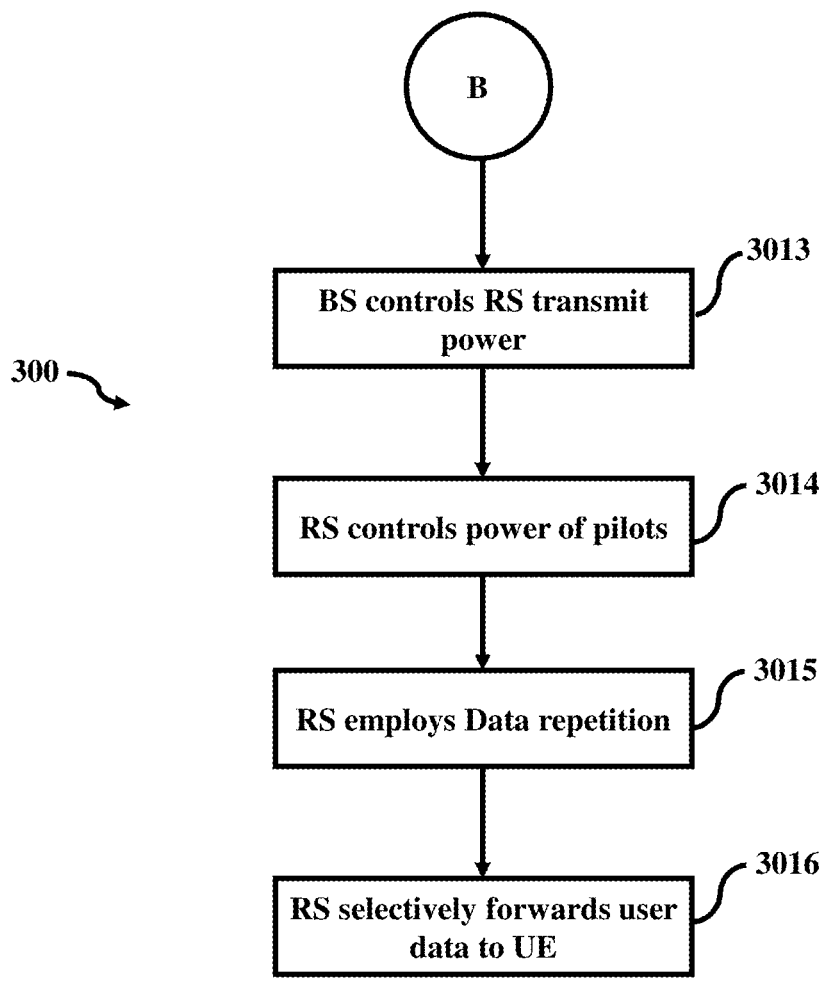

FIG. 3 is a flow chart depicting method for relay initialization and interference management. At the network entry stage, the RS 105 registers (301) with the BS 104. The BS 104 can also be referred to as serving BS 104. As a part of the registration, RS 105 informs the serving BS 104 about capabilities such as Hybrid Automatic Repeat Request (HARQ), transmit power, scheduling, and any other capability using a control message. Upon successful registration, the RS 104 would be assigned (302) a unique identifier. The unique identifier may be RSID which can be a new ID or a subset of BS 104 identifier (BSID). The RS 105 then searches for neighboring BSs 104 and RSs 105 in the range of the RS and report (303) the IDs and signal strengths received from neighboring BSs 104 and RSs 105 to the serving BS 105. The BS 104 allocates (304) a preamble to the RS 105 and resources to transmit the preamble so that the UE can determine the RSID and estimate the RS signal strength. The preamble may also be a pseudo preamble in the case of transparent relay stations (T-RS) to enable a UE to identify it for the purpose of signal/interference measurement. Alternatively, the RS 105 may derive the preamble from the RSID assigned by the BS 104. RSID and signal strength can also be obtained from the RS 105 specific reference signal or midamble derived using the RSID. In the case of MBS/PBS/FBS, there is no serving BS 104 and therefore, the core network assigns an ID to the equipment and all the communication will be done using the backhaul link between the network and MBS/PBS/FBS. The serving BS 104 may also assign some resources to RS 105 for broadcasting RS 105 resource allocation information and other control messages, and also for the data to be relayed. These control messages can carry information about the processing done at RS 105, power control instruction, or sounding instruction specific to a UE served by the RS 105.

Serving BS 104 may also reserve a few ranging preambles or ranging codes for UE-RS 105 ranging, even for T-RS.

The BS 104 periodically broadcast (305) information about RS 105, T-RS, MBS, PBS, FBS in a message. The message may contain RSID, preamble and the preamble location in the DL frame, and RS 105 UL ranging channel configuration in UL frame. The message may also carry the information about the RS 105, T-RS, MBS, PBS, FBS of the neighboring BS 104. As an example, a RS-INFO-BCH message is used for RS 105 information broadcast. The serving BS 104 shares the RS/MBS/PBS/FBS information with neighboring BSs 104 using backhaul or core network or over the air signaling. The RS 105 and MBS/PBS/FBS transmit the preamble assigned by the anchor BS 105 (or by the network) in a pre-assigned resource block. The RS 105 and MBS/PBS/FBS identify and measure Received Signal Strength Indication (RSSI) of the UE. The UEs detect the presence of RS 105, T-RS, MBS, PBS, FBS, and BS in their vicinity from the preamble or reference signal or midamble (306) and report (307) RSID and RSSI, Carrier to Interference-plus-Noise Ratio (CINR) or any other suitable metric to the serving BS 104 using a control message. BSs 104 may also share information regarding RS 105 served with a neighboring BS 104.

Based on the UE feedback sent in the form of a message, for example as a RS-INFO-REP message, the BS 104 will classify (308) the UEs with respect to each RS 105/T-RS/MBS/PBS/FBS as relay UEs and victim UEs 102. The relay UEs are UEs that receive significantly stronger signals from the RS 105 than BS 104. In general, the UEs that are not victim UEs of an RS/BS/MBS/PBS/FBS maybe also referred to as safe UEs with respect to that RS/BS/MBS/PBS/FBS. Victim UEs of a RS/BS/MBS/PBS/FBS are UEs, which experience significant interference from that RS/BS/MBS/PBS/FBS. The BS 104 can eliminate the interference between the RS 105/BS/MBS/PBS/FBS and victim UEs 102 by dynamically allocating partially or completely orthogonal resources for use in their access link (309).The resources allocated are in time, frequency, code and/or space. Interference between the RS 105 and MBS/PBS/FBS and neighboring BS 104 can also be eliminated by sharing resource allocation information of the victim UEs 102. The resources used by the RS 105/MBS/PBS/FBS can be reused by the base station for allocation to other UEs that are not victim UEs 102 with negligible degradation in the performance of relay UEs. Access Link refers to the link between RS/BS/MBS/FBS/PBS and its UEs. The BS 104 commands the RS 105 to forward (3010) the data for the relay UEs through a control message, for example the message may be a FWD-UE-CMD. BS 104 may directs the relay UE to receive or transmit data from or to the RS 105 by explicitly indicating in DL-MAP and UL-MAP. BS 104 may also direct the relay UE to receive or transmit data from or to the RS 105 by sending a control message. This can also be done by instructing the relay UE to read the RS 105 DL-MAP and RS 105 UL-MAP. BS can forward to RS, PBS, MBS, FBS a list of its victim UEs. In the case of RS 105, PBS, MBS, FBS having a scheduler, they may derive the resource allocation information of the victim UEs 102 from the DL-MAP and allocate the relay UEs in orthogonal resources (3011). Additionally RS can compose a list of its own victim UEs from the UL sounding channel measurements. The control message, such as FWD-RS-INFO, instructs the relay UE to receive/transmit data from/to the RS 105. The message may also indicate the resource on which the RS 105 will forward data relative to the resource allocation indicated in the DL-MAP, (e.g. time and/or frequency shifts, and repetition if any) and relative resources with respect to UL-MAP, in which the relay UE has to transmit data to RS 105 (e.g. advancing in time and/or frequency shift, and repetition if any).The RS 105 now starts forwarding (3012) data of relay UE. BS 104 may inform the RS 105 about its victim UEs 102 using a control message. In the case of RS 105 used for coverage extension, BS 104 may instruct the RS 105 to forward the all the control information to the relay UE.

The RS 105 through its control channel may instruct the relay UE to advance transmission, based on the timing offset measured from the ranging preamble. In UL all the data and some control information, such as Channel-Quality Indicator (CQI), Multiple-Input and Multiple-Output (MIMO) and feedback, are transmitted from the relay UE to BS 104 through the RS 105. Some of the relay UE control information may be received directly by the BS 104 if the UE-BS 104 link is available (e.g. scheduling requests and HARQ ACK can be transmitted directly from UE to BS 104).The network can thus reduce the transmission delay and overhead in RS 105-BS 104 uplink.

Based on the UE measurement report, the BS 104 controls (3013) the RS 105 transmit power on the RS 105-UE link via control messages to either modify the number of victim UEs 102 and/or to improve coverage area of the RS 105. Transmit power control is independent for RS 105 transmission to UE and RS 105 transmission to the BS 104. Uplink power control can be implemented in UE-RS 105 link, controlled by the RS 105. The RS 105 can send control messages, such as RS-CTRL-MESG message, to the UE through a control signaling channel. The control channel resources should be allocated by the BS 104 during the relay station registration process or via DL-MAP allocation in every frame.

Interference from pilots or interference to pilots in the RS 105 can be mitigated by controlling (3014) the power assigned to the pilots. The adverse impact of the RS 105's wide bandpilots for channel estimation can be mitigated by using a mix of wide band pilots with power control and dedicated pilots. The adverse impact of the RS 105's wide bandpilots for channel estimation can also be mitigated by using only wide band pilots with power control on them. Power control on wide band pilots at the RS 105 can be independent of the power control employed for the data blocks being forwarded by RS 105. The power control of these wide band pilots is a function of interference caused by the common pilots to the victim UEs 102 and degradation in channel estimation for the UE served by the RS 105 if the power of the wide band pilots is reduced. Depending on issues such as backward compatibility for pilot design, the interference scenario, the required channel estimation mean square error (MSE) to meet a specific target block error rate (BLER), either of the 3 options could be utilized i.e., only wide band pilots with power control, or only dedicated pilots, or a mix of wide band and dedicated pilots with power control. The option being utilized can be decided by the BS 104 based on the various factors mentioned and the power control to be employed on the wide band pilots at the RS 105 can be sent as a control message to the RS 105. The power control can be adaptive and the signal strength of the wide band pilots can be changed based on interference measurements in the system and required channel estimation mean square error at the UEs served by the RS 105.

The RS 105 can also selectively forward (3016) the user data to UE to reduce interference to other UEs. Performance can be improved by repeating the user data or some modified form of the data (3015) in multiple resource blocks spanning the frequency band of operation. User data can be repeated in original form or in modified form in the access link of specific group RS/BS/MBS/FBS/PBS, data can be repeated in correlated and/or uncorrelated blocks of time and/or frequency and/or space and/or code. Data repetition is to reduce any possible loss in performance in said access link due to unavailability of preferred band due to orthogonalization of resources, and/or power control in said access link to reduce said interference. The various actions in method 300 may be performed in the order presented, in a different order or simultaneously. Further, in some embodiments, some actions listed in FIG. 3 may be omitted.

Figure 4:
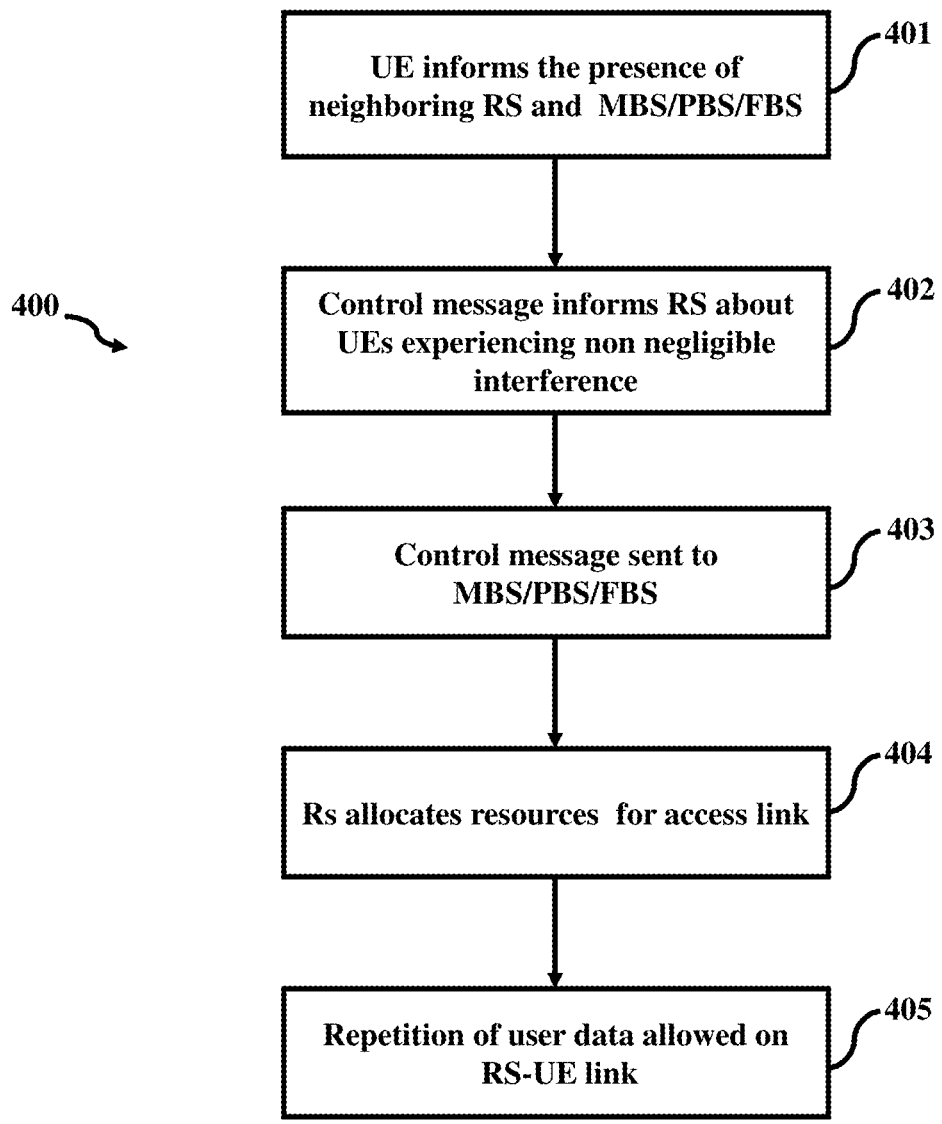
FIG. 4 is a flow chart depicting method to detect and identify the RS and MBS/PBS/FBS, in accordance with the embodiments herein.

FIG. 4 is a flow chart depicting method to detect and identify the RS and

MBS/PBS/FBS. A UE reporting mechanism periodically informs (401) the presence of neighboring the RS 105 and MBS/PBS/FBS and the signal strengths to the serving BS 104 or modification of existing reporting mechanism of the neighboring RS 105. A control message is used for RS-UE downlink power control. The control message informs (402) the RS 105 about the UEs experiencing non negligible interference from the RS 105 called the victim UEs 102 of the RS 105. The control message contains instructions to read the DL-MAP of RS or indicating relative arrangement of resources with respect to the DL-MAP on which RS 105 will retransmit to the UE e.g. time, frequency shift, advancing in time , frequency offset. The control message sent (403) to the MBS/PBS/FBS forwards the victim UEs 102 ID and/or the DL-MAP, UL-MAP resource allocation information to the MBS/PBS/FBS through the backhaul link. RS, MBS, PBS, FBS use victim UE information along with other relevant information available for allocating resources for their access link (404). In addition, the control message also informs the RS whether to relay the control messages such as DL-MAP, UL-MAP along with other data to the user. The repetition of the user data is allowed either in the original form or modified form on RS 105-UE link, spanning the frequency band of operation to improve diversity. Data is repeated to make up for any loss of data due to orthogonalization of data before being transmitted (405).

A UE may also be called as an Advance Mobile Station (AMS), an RS 105 may be called as an Advance Relay Station (ARS) or as a Relay node (RN) or Transparent Relay(T-RS) and a BS 104 may also be called as an evolved node-B (e-NodeB). The minimum possible resource allocation is called Logical Resource Unit (LRU) in IEEE 802.16m and Resource Block in 3rd Generation Partnership Project (3GPP)-LTE/LTE-A standard.

Embodiments disclosed herein propose that the control messages used for enabling or requesting or reporting measurements of the interference seen at each UE for Handover (HO) management at the BS 104/RS 105 or MBS/PBS/FBS, or the core Network can be modified using a one bit indicator for explicit interference measurement. This interference measurement is for purposes, such as classifying the UE as safe UE or as victim UE 102 with respect to each RS 105 and MBS/PBS/FBS in the cell. When the one bit field has a value of zero, the field indicates that the requested/reported measurements are for HO purpose. When the proposed one bit field has a value of one, the field indicates that the requested/reported measurements are interference measurements which may not be used for HO purpose. These interference measurements are used by the scheduler to classify each UE as safe or victim with respect to each RS/BS/MBS/PBS/FBS. The scheduler may be located at the BS or in the core network or an RS/MBS/PBS/FBS. Following this, the scheduler allocates completely or partially orthogonal resources dynamically to each RS 105 or to each BS/MBS/PBS/FBS with respect to its victim UE for its access link, such that the interference caused by the RS 105/BS 104/MBS/PBS/FBS is minimal to any UE scheduled in the same resource. Access link refers to the link between RS/BS/MBS/FBS/PBS and its UEs. The RS can be treated as a UE when it is communicating with a BS or another RS.

In a cellular system the RS 105 can be used to improve capacity and for coverage extension. Interference can be mitigated in cellular wireless networks with RS 105 and MBS/PBS/FBS in distributed scheduling mode. In embodiments disclosed herein, four information elements are used for enabling dynamic resource allocation in a distributed scheduling mode of operation. The four information elements are:

1) RS-RA-MSG—This information element in sent through a control message from the BS 104 to the RS 105 to allocate/bar, and/or add and subtract resources blocks to be used by the RS 105 in its access link to serve the UE. Resources can be dynamically managed and allocated to the RS 105 within a cell. For example, the message can be used to ensure that the RSs 105 and victim UEs 102 are scheduled in orthogonal resources. This information element can be used by the serving BS to allocate/bar, and/or add and subtract resources blocks to be used by MBS/PBS/FBS in its access link.

2) RS-RA-REQ—This information element is sent through a control message signaled from an RS 105 or MBS/FBS/PBS to a serving BS, or from a serving BS 104 to another BS 104 in the system. This can be used by the RS 105 or MBS/FBS/PBS BS 104 to request allocation/addition/subtraction of resources. Further, this message maybe used by a BS 104 to request to bar a set of resources for an RS 105 or MBS/PBS/FBS served by another BS 104 in the system.

3) RS-RA-INFO-REQ—This information element is sent through a control message signaled from the RS 105, MBS/PBS/FBS or the BS 104 to another RS 105, MBS/PBS/FBS or BS 104 in the system requesting its resource allocation information.

4) RS-RA-INFO-RSP—This information element is sent through a control message signaled from the RS 105, MBS/PBS/FBS or the BS 104 to another RS 105, MBS/PBS/FBS or BS 104 in the system containing resource allocation information.

The four information elements can be defined in the existing control messages or as new messages. These control messages which contain the information elements can be signaled over the air or over the backhaul. The resource referred to in the above four information elements can be units in time and/or frequency and/or code and/or space. In either case, the messages will enable the BSs 104 to do slower time scale centralized/distributed coordination of resources after taking into account factors such as interference measurements, Quality of Service (QoS) requirements, power control, persistent scheduling, best band constraints and any other factor. The information elements can also be called as resource allocation messages or as control messages. The control messages can be used by serving BS 104 to indicate to the RS 105 and the MBS/PBS/FBS the set of resources that the RS 105 and the MBS/PBS/FBS can use in the access link. The set of resources the RS 105 can use may be a function of various metrics such as the system load, interference measurement, best band constraints, QoS requirements, persistent scheduling, traffic distribution for RS 105 and BS 104, and any other metric.

Embodiments herein disclose a reduction/elimination of the interference caused by the RS 105 and the MBS/PBS/FBS when operating in distributed scheduling mode by dynamic allocation of orthogonal resources to the RSs 105 and the victim UEs 102. The interference is reduced/eliminated with minimal control signaling overhead and rendering greater flexibility to dynamically schedule their associated UEs. The overhead is minimal since the BS 104 only indicates to the RS 105 either the set of resources the RS 105 can or cannot use and does not need to give information such as which UE uses which part of the resources. Further the periodicity of the proposed resource allocation message need not be high. Embodiments disclosed herein may also be used in the context of cooperative communication where distributed scheduling is employed.

Embodiments herein disclose a Media Access Control (MAC) control message RS-RA-MSG to be signaled from the BS 104 to its associated RSs 105 and MBS/PBS/FBS. The control message can be used to inform the RSs 105 and MBS/PBS/FBS of the resource to be used in order to minimize/eliminate interference caused to the respective victim UEs. The RS-RA-MSG message may contain multiple RS-RA-MSG-IEs, each of which may contain individual resource allocation information. An example RS-RA-MSG is given in Table 1 below.

TABLE 1

| Syntax | Size | Notes |
|---|---|---|
| RS-RA-MSG( ){ For(n=0;n<N_RS ; n++) { RS-RA-MSG-IE( ) } } | — variable | N_RS 105 is number of ARS 105 and MBS/FBS/PBS BS 104 to which the Resources are allocated in this message |

The RS-RA-MSG may be transmitted at varying intervals depending upon the interference and mobility profile reported at the BS 104. In a loaded system (system with high UE density) RS-RA-MSG may be transmitted as frequent as every frame. In a system with lighter load, the interval between 2 RS-RA-MSG messages could be as long as a few seconds. In other words the interval of RS-RA-MSG may be anywhere between that in fixed partitioning to that in fully dynamic centralized scheduling. The RS-RA-MSG-IE message may include multiple allocations for a particular RS 105 or MBS/PBS/FBS with fields to identify the type of resource, such as offset in time, frequency and length of allocation. Similarly, RS-RA-MSG-IE message may be used to perform contiguous/non-contiguous resource allocations and be able to add/subtract resources to/from already allocated resources. Besides, RS-RA-MSG message could be used to block or bar RSs 105 or MBS/PBS/FBSfrom temporarily using some resources. The barred resources may be used to schedule associated victim UEs. Barring of resources may also help the system to reduce inter-cell interference. BSs 104 could share the allocation information of RS 105 or MBS/PBS/FBS and victim UE with each other. Based on this information, BS 104 may restrict its associated RSs 105 from transmitting in a particular band to reduce/eliminate inter-cell interference. An example RS-RA-MSG-IE message is given in Table 2 given below

| Syntax | Typical Size(bit) | Notes |
|---|---|---|
| RS-RA-MSG-IE( ){ | | |
| STID | 12 | Identifies the RS 105 or MBS/FBS/PBS BS 104 |
| N_Alloc | 4 | In this configuration there are 0-15 allocations are possible |
| For (m=0;m<N_Alloc c;m++){ | | |
| Type of Allocation | 2 | 0b00: new allocation 0b01: additional allocation 0b10: deletion of resources 0b11: barred region |
| Subframe Offset | 3 | |
| LRU Offset | 8 | |
| Boosting | 6 | Relay power may increase/decrease in a fixed range |
| No. Of LRUs | 6 | depending upon the number of LRUs available |
| No. of Subframes | 3 | |
| Duration (in no of frames) } } } | 8 | Duration of grant |

The RS-RA-MSG-IE message may contain the following fields:

a) Station ID (STID) field—Identify associated RS 105 or MBS/FBS/PBS. This field may be omitted if the RS-RA-MSG-IE is transmitted in unicast.

b) N_Alloc field—This field is used to indicate the number of allocations for the associated RS 105 or MBS/PBS/FBS. For example, if the BS 104 wants an associated RS 105 or MBS/PBS/FBS to be idle, the BS 104 could send the RS-RA-MSG-IE message with relevant STID information and N_Allocfield set to 0. For contiguous allocations the value of N_Alloc field may be 1.

c) Type of Allocation field—This field is of 2 bit length and is used to indicate if the allocation is new, addition/subtraction or for de-allocation/resource barring. For example, for a field value of Ob00, the RS 105 will discard all previous allocations and consider only new resources allocated. For field value of Ob01, resources allocated are added to those already allocated in previous RS-RA-MSG(s). The additional resources may be contiguous or non-contiguous in a frame. For field value set to Ob10, the indicated resources will be deleted from the previous allocation. If the field value is set to Ob11, then the resources indicated in the RA-RS-MSG-IE are barred from being used. Additionally, for the field value of Ob10, if the resources indicated in the message are not already allocated, and the previous allocation start with field value Ob11, then these resources will be considered to be barred (in addition to previous barred region) till the duration of barring expires or a fresh resource allocation happens, or message explicitly adding the same region is sent by the BS 104.

The resources to be allocated or barred could be indicated in multiple ways. The resources can be allocated or barred by indicating start of allocation in time domain with unit frames, sub-frames, or OFDM symbols and in frequency domain with unit sub-carrier index, LRU offset or RB index. The resources can also be allocated or barred by indicating the length of allocation in time domain (unit sub-frames or OFDM symbols) and frequency domain (units RUs, LRUs or RBs, frequency partitions or subcarriers).

In the example illustrated in Table 2, the time domain offset value is determined from the Sub-frame Offset field and the frequency domain offset is indicated in LRU offset field. The time and frequency domain allocation length is indicated by number of Sub-frames and number of LRU fields respectively. The resource index field may also be used to identify the start of allocation and length of allocation uniquely. The duration field indicates the time for which each resource allocation/de-allocation is relevant. The value of the duration field value could be as small as a frame to a few seconds. Different resources may have different durations. The BS 104 can temporarily allocate or bar resources to/from the associated RS 105 or MBS/PBS/FBS. This may be also useful for a UE with persistent allocation as the UE may suddenly experience interference from RSs 105 or MBS/PBS/FBS. In this case, the BS 104 may temporarily bar the associated RS 105 or MBS/PBS/FBS from using the same resources by sending a de-allocation RS-RA-MSG-IE. The type of Allocation field may be set to Ob10 and the Duration field may be set to the remaining duration of persistent allocation to UE. Duration field with a value 0 implies that the corresponding allocation will persist till a new RS-RA-MSG message is received. A boosting field indicates to the RS 105 or MBS/PBS/FBS whether to perform power control in the allocated resources. There are multiple ways to indicate the transmit power level information. It may be the absolute power level, or relative power level such as +3 dB boosting, −3 dB de-boosting etc. The value to be given in the Boosting field can be determined by the BS 104, based on various factors such as interference measurement reports received from the UEs, etc. the values could also be based on the request sent by an associated RS 105 or MBS/PBS/FBS or a neighboring BS 104. To avoid interference between a particular RS 105 or MBS/PBS/FBS (say RS1), and UE served by another RS 105 or MBS/PBS/FBS (say RS2), relevant unicast RS-RA-MSG(s) maybe shared with RS1 and RS2 from the respective serving BSs 104. If the RS-RA-MSG is broadcast, then RS2 may scan the RS-RA-MSG-IEs of RS1 to determine the resources allocated to RS2. RS2 can schedule the UE in resources that are orthogonal with respect to the resources of RS1.

The RS-RA-REQ MAC control message is transmitted by the RS 105, MBS/PBS/FBS or by a neighboring BS 104 requesting to allocate or de-allocate (bar) resources to/from the RS 105 or MBS/PBS/FBS. If a neighboring BS 104 or RS 105 or MBS/PBS/FBS, for any reason (including interference management), wants to restrict (or allow) an RS 105 or MBS/PBS/FBS from using (or to use) some resources, the neighboring BS 104 or RS 105 or MBS/PBS/FBS could request the serving BS 104 with the RS-RA-REQ message with appropriately filled fields. The BS 104 may discard the RS-RA-REQ message. If the BS 104 accepts the request, then the BS 104 sends the corresponding RS-RA-MSG-IE to the requesting BS 104/RS 105. If an RS 105 or MBS/PBS/FBS requires additional resources, all fields in the RS-RA-REQ message, except for No. of LRUs, Duration and Type of Allocation fields, may be optional. Table 3 is an example of RS-RA-REQ MAC transmission.

TABLE 3

| Syntax | Size(bit) | Notes |
| --- | --- | --- |
| RS-RA-REQ( ){ | | |
| STID of Relay | 12bit | optional RSID |
| Type of allocation | 2 | 00: new allocation<br>01: additional allocation<br>10: substraction<br>11: barred region |
| Subframe Offset | 3 | optional |
| LRU Offset | 8 | optional |
| Boosting | 6 | Relay power may increase/decrease in a fixed range optional field |
| No. Of LRUs | 6 | depending upon the number of LRUs available requested |
| No. of Sub-frames | 3 | optional |
| Duration (in no of frames) | 8 | Duration of grant |
| } | | |

The example in table 3 illustrates possible application of the RS-RA-REQ message. Consider a scenario where there are two BSs 104, BS1 and BS2, an RS 105 and 3 UEs. The UE served by BS2 will experience interference from RS 105 and the UE informs BS2 of the interference experienced using interference measurement reporting. Depending upon the interference experienced, BS2 could request BS1 to limit the power of the RS 105, or restrict the RS 105 to a certain band, or even put the RS 105 in idle mode. The request is sent using a RS-RA-REQ message from BS2 to BS1. In response, BS1 could share RS-RA-MSG-IEs messages of RS 105 with BS2, so that BS2 could schedule the UE in orthogonal resources. Further, BS1 could instruct RS 105 to restrain from using certain resources, reduce the transmit power level or force RS 105 to enter idle/sleep mode. In addition it is possible for systems to use super frames that span multiple frames. The BS 104 can limit the resources allocated to the RS 105 or MBS/PBS/FBS to few frames or sub-frames of the super-frame using the RS-RA-MSG-IE message. For example, the RS 105 forwarding only VoIP traffic need not be operational in every frame.

To reduce signaling overhead or to simplify the decision for allocation at the BS 104, the message could be sent with allocation or de-allocation message in one dimension. An example of RS-RA-MSG message, with one dimensional allocation is shown in Table 4. The one dimensional allocation could be in time domain (for e.g. sub-frames) or in frequency domain (for e.g. Frequency partitions, sub channels or LRUs.

TABLE 4

| Syntax | Typical Size(bit) | Notes |
| --- | --- | --- |
| RS-RA-MSG-IE( ){ | | |
| STID | 12 | Identifies the RS 105 or MBS/FBS/PBS 104 |
| N_Alloc | 4 | In this configuration there are 0-15 allocations are possible |

TABLE 4-continued

| Syntax | Typical Size(bit) | Notes |
| --- | --- | --- |
| For (m=0; m<N_Alloc; m++){ | | |
| Type of Allocation | 2 | 0b00: new allocation<br>0b01: additional allocation<br>0b10: deletion of resources<br>0b11: barred region |
| Boosting | 6 | Relay power may increase/decrease in a fixed range |
| Start of frequency partition | 6 | depending upon the number of LRUs available |
| No. of frequency partitions | 3 | |
| Duration (in no of frames)<br>}<br>} | 8 | Duration of grant |

Table 4 depicts an example of a one dimensional Allocation in RS-RA-MSG-IE. Embodiments herein disclose an efficient resource allocation in a network with no centralized controller entity (examples include WIFI networks, WIMAX Femtos, etc) or minimal centralized control. Each RS 105 or/and MBS/PBS/FBS chooses the resources based on the resources used by neighboring or interfering RS 105 or/and MBS/PBS/FBS. After N/W entry, each RS 105 and/or MBS/PBS/FBS will obtain a list of resources used by the neighboring (interfering) RS 105 and/or MBS/PBS/FBS/BS through backhaul or over the air link. Based on the obtained list of resources used by other RS/MBS/PBS/FBS/BS and also interference measurements and any additional information available, each RS 105 and/or MBS/PBS/FBS chooses a set of resources for the own access link.

Further, each RS 105 and/or MBS/PBS/FBS will periodically transmit a resource list to the serving BS 104 and the neighboring RSs 105 and neighboring MBS/PBS/FBS/BS indicating the list of resources that is being used by it. The BS 104 can use the information while allocating resources for users served directly by the BS 104, while the information can be used at the neighboring RS 105 or MBS/PBS/FBS/BS to aid in the resource allocation. Besides, if an RS 105 or MBS/PBS/FBS needs additional resources, the RS 105 or MBS/PBS/FBS could request other RS(s) 105 and/or MBS/PBS/FBS(s) (that are using the resources) using the RS-RA-REQ message. In this case the BS 104 does not directly control the resources to be allocated to each RS 105 or RS 105 or MBS/PBS/FBS. However, if required, the serving BS 104 can send a control message to each RS 105 and/or MBS/PBS/FBS, indicating the resources it can or cannot use. The message can override the resource selection done by the RS 105 or by the MBS/PBS/FBS since the BS 104 may have more information about the interference profile of UEs in the cell. Thus resources may be allocated more efficiently such that the spectrum reuse is maximized and the outage due to interference is minimized.

In order to facilitate the request of resource allocation information amongst RSs 105 or MBS/PBS/FBSs, embodiments herein disclose a control message RS-RA-INFO-REQ. In response, the RS 105 shares relevant resource allocation information through backhaul or over air link in the form of a RS-RA-INFO-RSP message or by the RS-RA-MSG message. An example RS-RA-INFO-REQ message is illustrated in Table 5.

TABLE 5

| Syntax | Typical Size(bit) | Notes |
| --- | --- | --- |
| RS-RA-INFO-REQ ( ){ | | |
| STID | 12 | Identifies the RS 105 and/or MBS/FBS/PBS/BS or BS 104 |
| Type of RA Information<br>} | 1 | 0b0: Full Allocation Info<br>0b1: barred region Info |

The RS-RA-INFO-REQ message may have two fields. The two fields may be the STID field (optional if unicasted) used to identify the RS 105 and/or MBS/PBS/FBS or (macro) BS 104 to which information is requested. The second field is the Type RA information field used as a one bit field to indicate whether full resource allocation information is requested or just the resources that the RS 105, MBS/PBS/FBS or BS 104 are barred from using for transmission (barred region). Further, the message could be piggybacked with other messages such as RS-RA-MSG message or AAI_NBR-INFO message by adding a one bit field. The one bit field may be the Type of RA information Field. When the RS 105 and/or MBS/PBS/FBS or (macro) BS 104 receives RS-RA-INFO-MSG message with Type of RA information Field, it may respond with resources (sub channels, sub frames and/or LRUs) that it will not use and the duration for which the response is valid. An example RS-RA-INFO-RSP is illustrated in Table 6.

TABLE 6

| Syntax | Typical Size(bit) | Notes |
| --- | --- | --- |
| RS-RA-INFO-RSP( ){ | | |
| STID | 12 | Identifies the RS 105 or MBS/FBS/PBS104 |
| N_Alloc | 4 | In this configuration there are 0-15 allocations are possible |
| For (m=0;m<N_Alloc;m++){ | | |
| Type of Allocation | 2 | 0b00: new allocation<br>0b01: additional allocation<br>0b10: deletion of resources<br>0b11: barred region |
| Subframe Offset | 3 | |
| LRU Offset | 8 | |
| Boosting | 6 | Relay power may increase/decrease in a fixed range |
| No. Of LRUs | 6 | depending upon the number of LRUs available |
| No. of Subframes | 3 | |
| Duration (in no of frames)<br>}<br>} | 8 | Duration |

Figure 5:
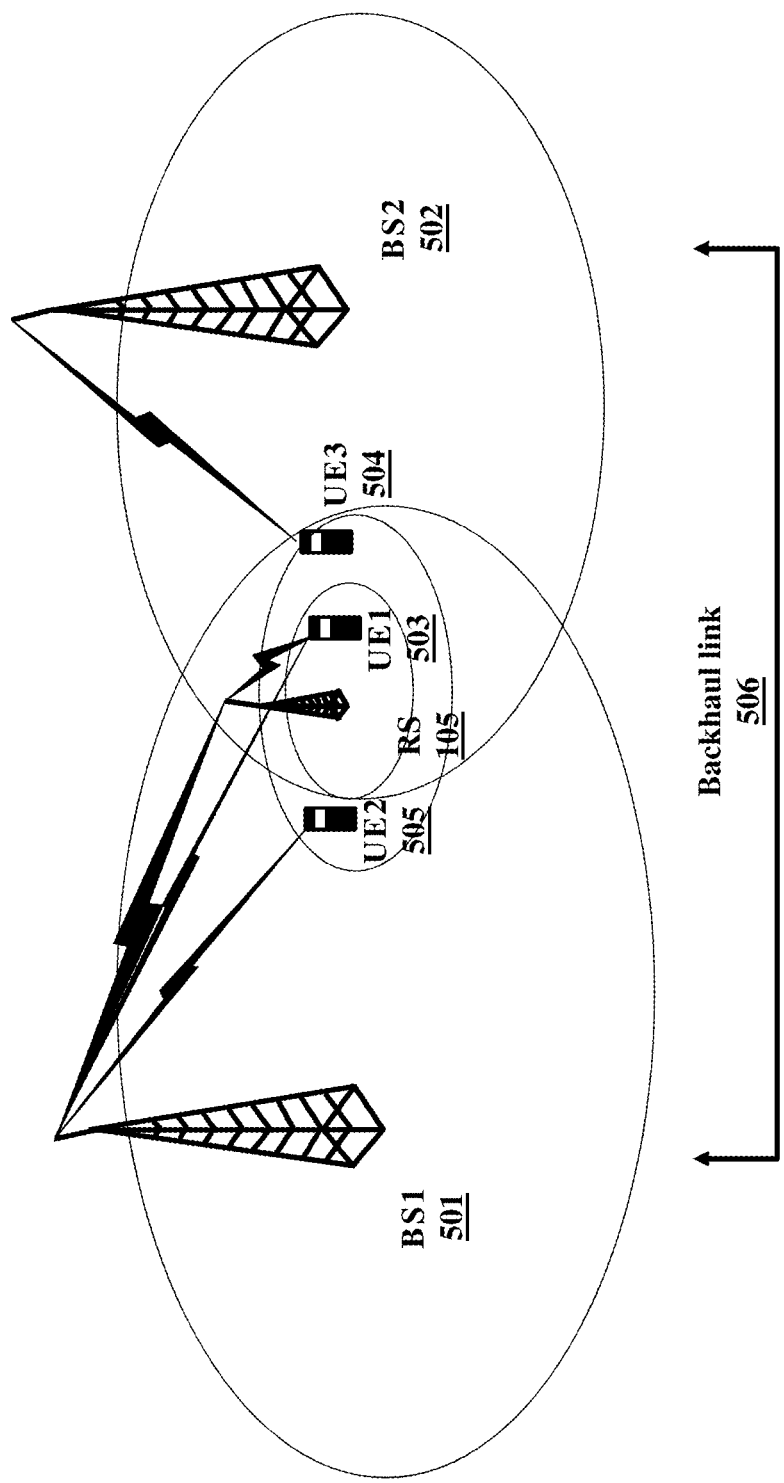
FIG. 5 illustrates a cell having two Base Stations (BSs) and three User Equipments (UEs), in accordance with the embodiments herein.

FIG. 5 illustrates a cell having two Base Stations (BSs) and three User Equipments (UEs). Consider a scenario where there are two BSs 104, BS1 501 and BS2 502, an RS 105 and 3 UEs as shown in FIG. 5. The UE served by BS2 502 will experience interference from RS 105 and inform BS2 502 of the interference using interference measurement reporting. Depending upon the interference experienced, BS2 502 could request BS1 501 to limit the power of the RS 104 or restrict RS 105 to a certain band, or even put the RS 105 in idle mode. For example, this request may be sent using a RS-RA-REQ message through the back-haul link between BS2 502 and BS1 501. In response, BS1 501 could share RS-RA-MSG-IEs of RS 105 with BS2 502, so that BS2 502 could smartly schedule UE in orthogonal resources. Further, BS1 501 could instruct RS 105 to restrain from using certain resources, reduce the transmit power level or force RS 105 to enter idle/sleep mode.

The embodiments disclosed herein can be implemented through at least one software program running on at least one hardware device and performing network management functions to control the network elements. The network elements shown in FIG. 1, FIG. 2 and FIG. 3 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for interference management in heterogeneous/homogeneous communication networks, wherein the communication networks comprise one or more Base Stations (BS), Relay Stations (RS), Femto Base Stations (FBS), Pico Base Stations (PBS), and Micro Base Stations (MBS), said method comprising:
    a plurality of User Equipment (UEs) performing interference measurement for a specific group of said BS, RS, FBS, PBS, and MBS and said UE sending said interference measurement to a serving BS;
    said serving BS classifying each of the UEs as either a victim UE of said BS, RS, FBS, PBS, and MBS or as a safe UE based on the measurement received from said UEs;
    said serving BS sending to each of said BS, FBS, PBS, and MBS a list of victim UEs, and said RS either receiving a list of its victim UEs from said serving BS or from uplink (UL) signaling; and
    each of said BS, RS, FBS, PBS, and MBS performing resource allocation for said UEs of said BS, RS, FBS, PBS, and MBS, wherein a set of resources in said resource allocation is partially or completely orthogonal to resources in time and/or frequency and/or code and/or space utilized by said victim UEs of said BS, RS, FBS, PBS, and MBS.

2. The method of claim 1, wherein each of said BS, RS, FBS, PBS, and MBS reads relevant resource allocation information messages comprising information of said victim UEs and uses said information for performing said resource allocation for other associated UEs of said BS, RS, FBS, PBS, and MBS.

3. The method of claim 1, wherein user data is repeated in an original form or in a modified form in a link between each of said BS, RS, FBS, PBS, and MBS and particular ones of said UEs, wherein data repetition is performed to reduce any possible loss in performance in an access link due to an unavailability of a preferred band due to orthogonalization of resources, and/or power control in said access link to reduce interference, and wherein said data is repeated in correlated and/or uncorrelated blocks of said time and/or frequency and/or space and/or code.

4. The method of claim 1, wherein a UE of said plurality of UEs detects a presence of the RS, FBS, PBS, or MBS in a vicinity from a preamble and said UE reports an unique identifier, a Received Signal Strength Indication (RSSI), and/or a Carrier to Interference-plus-Noise Ratio (CINR), and/or a function of RSSI/CINR to said serving BS using a control message, and wherein said RSSI and said CINR are measured from said preamble for each of said BS, RS, FBS, PBS, and MBS in a group to be scanned by the said UE and specified by said serving BS.

5. The method of claim 4, wherein said control message informs said RS about said UE experiencing non-negligible interference from said RS.

6. The method of claim 4, wherein said control message from said serving BS forwards identifiers and resource allocation information of the victim UEs to said FBS, PBS, and MBS through a backhaul link or over an air interface.

7. The method of claim 1, wherein each of said BS, RS, FBS, PBS, and MBS enables dynamic resource allocation using multiple information elements in said heterogeneous/homogeneous communication networks, and wherein said method further comprises any of:
    one of said multiple information elements is used by any of the BS, RS, FBS, PBS, and MBS to request any of said BS, RS, FBS, PBS, and MBS to allocate, bar, add, or subtract resources to be used in an access link;
    one of said multiple information elements is used by any of said BS, RS, FBS, PBS, and MBS to request resource allocation information of any of said BS, RS, FBS, PBS, and MBS;
    one of said multiple information elements is used by any of said BS, RS, FBS, PBS, and MBS to convey resource allocation information of each of said BS, RS, FBS, PBS, and MBS to requesting BS, RS, FBS, PBS, and MBS; and
    one of said multiple information elements is used by said serving BS to allocate, bar, add, or subtract resources to be used by each of said BS, RS, FBS, PBS, and MBS in said access link.

8. The method of claim 7, wherein said resource allocation information of the victim UEs is shared between said BS, RS, FBS, PBS, and MBS.

9. The method of claim 7, wherein a message containing said multiple information elements containing said resource allocation information of said victim UEs is forwarded to each of said BS, RS, FBS, PBS, and MBS through a backhaul link or over an air interface.

10. The method of claim 7, wherein a message containing said multiple information elements is sent from said serving BS or a resource entity in said networks indicating the set of resources to each of the RS, FBS, PBS, and MBS that can be used in said access link.

11. The method of claim 10, wherein said set of resources is a function of various metrics, wherein said various metrics comprise at least one of:
    a system load;
    the interference measurement;
    a best band constraint;
    a Quality of Service (QoS) requirement;
    a persistent scheduling; and
    a traffic distribution for said RS and said serving BS.

12. The method of claim 7, wherein said multiple information elements comprise at least one of:
a BS, RS, FBS, PBS, and MBS unique identifier;
a number of non-contiguous allocations;
a type of allocation field;
an offset in units of a minimum possible resource unit in frequency;
an offset in units of the minimum possible resource unit in time;
an amount by which a transmit power has to be increased or decreased;
a duration for which the resource allocation is valid;
a number of units of the minimum possible resource unit in time;
a number of units of the minimum possible resource unit in frequency;
a code sequence to be used; and
an antenna transmission mode.

13. The method of claim 7, wherein said multiple information elements comprise allocations for multiple ones of the RS, FBS, PBS, and MBS.

14. The method of claim 7, wherein a message containing said multiple information elements is used to bar the resources from being used by the RS, FBS, PBS, and MBS.

15. The method of claim 7, wherein a message containing one information element of said multiple information elements is signaled by the RS, FBS, PBS, and MBS to said serving BS to request allocation and/or addition and/or subtraction and/or de-allocation of the resources for said access link.

16. The method of claim 7, wherein a message containing one information element of said multiple information elements is signaled by each of said BS, RS, FBS, PBS, and MBS to another BS, RS, FBS, PBS, and MBS or said serving BS to request barring or de-allocation of the resources for said access link.

17. The method of claim 7, wherein the RS, FBS, PBS, and MBS make requests for additional resources using control messages.

18. The method of claim 7, wherein a message containing one information element of said multiple information elements is used to make a request for information about resources allocated to the RS, FBS, PBS, and MBS.

19. The method of claim 7, wherein a message containing one information element of said multiple information elements is used for at least one of:
performing contiguous/non-contiguous resource allocations and be able to add/subtract resources to/from allocated resources;
indicating to the RS, FBS, PBS, and MBS whether to perform power control in said allocated resources; and
enabling said BS to share resource allocation information of the RS, FBS, PBS, and MBS and the victim UEs with each other.

* * * * *